(12) United States Patent
Nixon-Lane (10) Patent No.: US 8,604,343 B2
(45) Date of Patent: Dec. 10, 2013

(54) WINDOW COMPATIBLE ELECTRICAL POWER DEVICE

(76) Inventor: Karen Nixon-Lane, Plymouth, MI (US)

( * ) Notice: Subject to any disclaimer, the term of this patent is extended or adjusted under 35 U.S.C. 154(b) by 138 days.

(21) Appl. No.: 13/160,876

(22) Filed: Jun. 15, 2011

(65) Prior Publication Data

US 2012/0031664 A1 Feb. 9, 2012

Related U.S. Application Data (60) Provisional application No. 61/355,812, filed on Jun. 17, 2010.

(51) Int. Cl.
| | | |
|---|---|---|
| H01B 7/08 | (2006.01) | |
| H05K 1/00 | (2006.01) | |
| H02B 1/26 | (2006.01) | |
| H02G 3/22 | (2006.01) | |
| H01B 7/00 | (2006.01) | |
| H01B 11/02 | (2006.01) | |
| H01R 11/00 | (2006.01) | |

(52) U.S. Cl.
USPC .............. 174/117 FF; 174/117 F; 174/254; 174/494; 174/505; 174/114 R; 439/502

(58) Field of Classification Search
USPC ........... 439/494, 495, 496, 498, 499, 502, 86, 439/89, 268, 278, 279, 420, 422, 426, 590
See application file for complete search history.

(56) References Cited

U.S. PATENT DOCUMENTS

| | | |
|---|---|---|
| 423,449 A | 3/1890 | Seely |
| 3,763,307 A | 10/1973 | Wolf |
| 3,894,225 A | 7/1975 | Chao |
| 4,287,385 A | 9/1981 | Dombrowsky |
| 4,319,075 A | 3/1982 | Willette |
| 4,381,420 A | 4/1983 | Elliott et al. |
| 4,780,094 A * | 10/1988 | Batty et al. ................. 439/492 |
| 4,969,840 A | 11/1990 | Ii et al. |
| 4,995,181 A | 2/1991 | Wolf |
| D319,609 S | 9/1991 | Brown |
| 5,135,413 A | 8/1992 | Pannizzo |
| 5,310,355 A | 5/1994 | Dannatt |
| 5,329,437 A | 7/1994 | Briggs |
| 5,601,360 A | 2/1997 | Paquette |
| 5,803,764 A | 9/1998 | Ness |
| 5,829,869 A | 11/1998 | Clegg et al. |
| 6,392,147 B1 | 5/2002 | Hier et al. |
| D461,774 S | 8/2002 | Genicevitch |
| 6,601,977 B2 | 8/2003 | Gesue |
| 7,086,687 B2 | 8/2006 | Aoki et al. |

(Continued)

*Primary Examiner* — Hoa C Nguyen
*Assistant Examiner* — Binh Tran
(74) *Attorney, Agent, or Firm* — Brinks Gilson & Lione (57) ABSTRACT

A device that supplies electrical current to various outdoor locations via through-hole areas of building structures, such as window frames, door openings, etc. which includes a flatten portion with a male electrical outlet plug coupled to one end and one or more female electrical outlet(s) coupled to the other end. The male electrical outlet plug and/or the one or more female electrical outlet(s) can be coupled to the flattened portion by an electrical cord. The flattened portion includes two or more flat electrical conductors. A further embodiment is built into the structure of a window or the structure of a window frame and provides an interior accessible male electrical outlet plug (or electrical cord) and an accessible exterior female electrical outlet that are coupled together by wiring that extends through the window or window frame and optionally through a tube.

3 Claims, 9 Drawing Sheets

(56) References Cited

U.S. PATENT DOCUMENTS

| | | |
|---|---|---|
| 7,238,029 B2 | 7/2007 | Tsubaki |
| 7,271,346 B1 | 9/2007 | Ettinger et al. |
| 8,308,505 B2 * | 11/2012 | Hatton et al. ................ 439/502 |
| 2003/0183349 A1 | 10/2003 | Gresham et al. |
| 2007/0187133 A1 | 8/2007 | Amato et al. |

\* cited by examiner

WINDOW COMPATIBLE ELECTRICAL POWER DEVICE

RELATED APPLICATION

The present application is based upon U.S. Provisional Patent Application Ser. No. 61/355,812, filed Jun. 17, 2010 to which priority is claimed under 35 U.S.C. §120 and of which the entire specification is hereby expressly incorporated by reference.

BACKGROUND

The present invention relates generally to electrical power supply devices. More particularly, the present invention relates to power supply devices that are configured to provide convenient electrical current access to outdoor locations via through-hole areas of buildings, such as window frames, door openings, etc.

It is often desirable to provide electrical current access to outdoor areas of buildings, especially during seasonal periods. For such purposes, buildings are typically equipped with a limited number of electrical outlets. However, in some cases, such as in relatively small, low-end and/or older houses, there are no outdoor electrical sources at all, with the possible exception of outdoor lights.

Providing electrical power to outdoor areas around buildings typically involves running one or more extension cords between the outdoor area at which electrical power is desired and an available outdoor electrical outlet, wherever it may be located, and plugging into the outlet. In many cases multi-outlet adaptors are used to accommodate a limited number of plugs.

During seasonal periods, at which time many electrical light strings and/or electrical decorations are placed on the exterior of buildings for decorative purposes, the above method of providing the necessary electrical power very often presents problems associated with overloading outdoor circuits. Also, running a plurality of extension cords across areas of the ground creates an undesirable condition for electrical elements whose connections are lying on the ground and exposed to water in the form of snow, rain, ice, etc. This condition is potentially hazardous when cords must be laid down across sidewalks, porches, driveways, and around areas where people walk, in order to reach available outdoor electrical outlets. Further, electrical cords, which frequently must be run across long distances to reach outlets, are unsightly and this process requires more cords than would normally be needed to reach a nearby outlet, if one were present and available.

Frequently, there are times during these seasonal periods when one or more of the electrical cord connections become dislodged from another, or exposed to water at which time an electrical short is created, causing a circuit breaker to trip or a fuse to blow. When this happens, it becomes a considerable task to locate the failed area outdoors in order to repair the situation. Cords become buried beneath snow and ice, and inclement weather itself often makes this an extremely undesirable job to accomplish.

In addition to seasonal periods, there are other occasions when it might be desirable to have electrical power available in outdoor areas that are not in the proximity of existing outdoor power outlets. It is often desirable to connect electrical devices such as televisions, stereos, and the like, for outdoor entertainment purposes, as well as gardening and lawn maintenance equipment like trimmers, edgers, mowers, battery chargers, etc.

Most standard low amperage electrical cords and electrical extension cords currently available are manufactured in a relatively flat form, for manufacturing ease and to separate the individual conductive wires. Examples of these include indoor cords used for lamps and other small appliances, indoor-rated electrical extension cords, etc. Larger capacity electrical cords, which by their nature must contain larger diameter wires and often ground wires, are either made in round form or flat, as desired by the manufacturer.

There are several patents that attempt to address and reduce or eliminate certain problems associated with electrical cords as utilized in specific applications. These patents address issues such as bulkiness, unsightliness, tripping hazards, etc.

U.S. Pat. No. 4,780,094 to Batty et al. discloses a flat electrical cord for indoor use that is intended to minimize tripping hazards and provide for low-profile electrical extension cords to be run underneath carpets and rugs.

U.S. Pat. No. 3,524,921 to Wolf discloses a similar flat electrical cord whose primary feature is that it is low-profile and paintable for discreet mounting on walls, etc. via an adhesive component, when electrical power is desired to small appliances such as wall-mounted clocks.

These patents are not concerned with providing outdoor power capability from indoor power outlets via through-holes in buildings. They are strictly limited to indoor applications.

U.S. Pat. No. 5,135,413 to Pannizzo discloses a window-mounted outlet in which, after a window is opened, the device is inserted and the window closed down onto the device. In this application, the window stays in a partly opened position to accommodate the space required for the window outlet unit. Locking the window therefore becomes a problem, as does the setting of any alarm system built into the structure. The visible nature of the device also advertises to passersby, potential burglars, etc. the fact that the window is open and may facilitate unhampered access to the interior of the building. Moreover, the device, when inserted into the window frame is quite large, difficult to install, and it disrupts the aesthetic appearance of the window and surrounding area. All of these factors make this a less than desirable solution to providing electrical power to one or more outdoor areas from the inside.

U.S. Pat. No. 6,497,502 to Clift et al discloses an example of an electric window-mounted candlestick. While this invention does utilize indoor power and mounts using the window sash and frame for positioning, it is designed only for the limited purpose of providing power to a single, low-voltage light bulb.

U.S. Design Pat. No. Des. 319,609 to Brown discloses an ornamental design for a power extension cord.

U.S. Patent Application Publication No. US 2007/0187133 to Amato et al. discloses a coaxial jumper cable unit that is meant to facilitate connecting to units to one another via a window opening.

Standard electrical extension cords have serious and dangerous drawbacks in through-opening window applications, and are therefore not recommended for the purpose of providing adequate outdoor power from indoor outlets.

These drawbacks include, but are not limited to: 1) Shock hazard created from frayed cords coming in contact with metal, water, etc. after repeated opening and closing of windows onto the cords; 2) Lack of flexibility of electrical extension cord material to be successfully bent across the surface profile of window sash, sill and frame; 3) Lack of durability of the extension cord material to withstand repeated compression of cords in a window opening application; and 4) Lack of adequate thinness of currently available extension cord material to provide adequate electrical power for outdoor purposes while still being able to close and lock windows The nature of electrical current dictates that the cross-section of the conductive material, e.g., copper wire, is calculated to ensure that sufficient electrical current is able to pass through the material to achieve the desired power rating. Typically, different gauge wires are used to achieve this goal, the area being calculated according to the diameter of the wire.

In typical extension cords and wired electrical devices, including all of the examples listed and referred to herein, whether flat, round or other decorative shape, the conductive material itself, i.e., the wires located inside the insulating casing is round. This is merely the traditional means of manufacturing (drawing) copper electrical wire, and not an absolute necessity.

The present invention provides power supply devices that are configured to provide convenient electrical current access to outdoor locations via through-hole areas of buildings, such as window frames, door openings, etc.

BRIEF SUMMARY

According to various features, characteristics and embodiments of the present invention which will become apparent as the description thereof proceeds, the present invention provides a flexible electrical extension cord adaptor unit that can be mounted in window frame openings that includes at least two standard grounded plug ends and a flat insulated ribbon connecting the two ends that carries the required wiring between the plug ends.

The present invention further provides a method of installing the flexible electrical extension cord adaptor units in window frames or other indoor-to-outdoor through-hole openings which method involves the steps of:

unlocking and opening the window;
placing the adaptor portion of the cord assembly in a convenient area within the window frame so that one plug end is accessible to the outdoor side, the other plug end is accessible to the indoor side and so that the flat wiring ribbon portion lies in between;
closing the window, trapping the flat adaptor portion of the cord assembly between the window and the frame; and
locking the window in a normal fashion.

BRIEF DESCRIPTION OF THE DRAWINGS

The present invention will be described with reference to the attached drawings which are given as non-limiting examples only, in which.

DETAILED DESCRIPTION OF THE DRAWINGS AND THE PRESENTLY PREFERRED EMBODIMENTS

The present invention is directed to power supply devices that are configured to provide convenient electrical current access to outdoor locations via through-hole areas of buildings, such as window frames, door openings, etc.

The power supply devices of the present invention include electrical extension cords and connectors that are configured and made of materials that allow them to safely be used in indoor-to-outdoor, through-opening applications and provide a solution to the inherent drawbacks associated with utilizing typical electrical cords and devices in a through-mounted setting.

The present invention provides means of accessing indoor electrical outlets via normal through-hole areas of building structures, such as window frames, door openings, etc., while maintaining existing built-in security features and permitting these areas to remain visually pleasing.

According to the present invention, in order to create a cord or section of a cord that is as thin as possible, the conductive material utilized is a flat sheet or plurality of sheets of copper foil, or round wires that have been altered to achieve a flattened center section.

In the case of flat sheets or a plurality of sheets of copper foil, the proper power rating is achieved by calculating the cross-section of the copper foil (thickness×width) in a similar manner as calculating the cross-section of standard round wire by its diameter. By choosing a flexible, rectangular, flat shape for the conductive components, and encasing them in a durable, flexible insulating material, an electrical cord can be created with a thin, flexible section which: 1) Is able to satisfy a desired or necessary power rating; 2) Allows the thin section of the cord to be positioned between the window portion and the surrounding frame/sill; and 3) Allows the window to be closed and locked in a normal fashion.

In the case of using round wires that have been altered to achieve a flattened center section the gauge of the wires can be selected for a given amperage use before flattening the wires.

The present invention provides electrical extension cords, power cords and the like that use flat, conductive material inside insulated casings and which are sufficiently flexible so that they can be positioned across the profile surface between window openings and windows. The configuration and physical characteristics of the present electrical extension cords, power cords and the like enable them to fit into the space between window sash and the window frame and allow the window to be closed and locked in a normal fashion. Moreover at least the flat portions of the electrical extension cords, power cords and the like are flexible enough to pass through and conform to the shape of the through-openings and accommodate a variety of corresponding window ledge designs.

The present electrical extension cords, power cords and the like are made of durable materials which allow them to withstand repeated use over a long period of time without abrading, breaking, puncturing or otherwise compromising the insulating properties and exposing electrical wires which would create a shock hazard.

The present electrical extension cords, power cords and the like are robust enough to make adequate electrical current available to supply appliances, multiple light strands, and the like to outdoor areas.

The electrical devices of the present invention, which are referred to herein as including, but not limited to extension cords and power cords, include a length of electrical conductors and an insulating casing and a male electrical plug on one end and one or more female plugs on an opposite end. At least a portion of the length of the electrical devices is configured to be flat so as to pass beneath a window, door, screen or some other structure associated with the through-opening of a building. The flattened portion can be located near one end or anywhere along the length of the electrical devices and can be just long enough to pass under a window, door, sliding door, screen or some other structure associated with the through-opening of a building or be longer as desired.

There can be two or more electrical conductors that extend the length of the electrical devices. Along the flattened portion the electrical conductors are flat. Otherwise, along the non-flattened portion, the electrical conductors can be round or have any convenient cross sectional shape. The electrical conductors can be continuous unitary structures. Otherwise the flattened portions of the conductors can be formed separately and coupled at opposite ends to lengths of non-flat electrical conductors.

Both the flattened and non-flattened portions of the electrical conductors can be manufactured with different size conductive areas in order to accommodate different power ratings. The devices themselves can be manufactured in various configurations to accommodate different designs and capabilities. Some of these include, but are not limited to manufacturing the flat portion: 1) As a stand-alone item with standard or special male and female connector plugs built onto both indoor and outdoor ends of the flattened portion; 2) With standard electrical cords and connector plugs built into both ends of the flattened portion; 3) With only an indoor portion of the electrical cord built into the units; 4) With one or more female plug ends built into the outdoor end of the units; and 5) With ground fault circuit interrupters built onto the unit for added protection.

One manner of providing the flattened portions of the electrical devices according to the present invention involves: 1) Selecting the proper gauge copper wires or individual strands of wires required to achieve the desired power rating for the extension cord application; 2) Laying the wires or a plurality of wire strands parallel to each other with proper insulating distance (calculated for the final flattened width) between the individual wires or sets of individual wire strands; 3) Laying down reinforcing cords/threads lengthwise in between the conductive wires to increase durability, tear resistance, and the like; 4) Passing a pinch roller or other compression device over or otherwise compressing the center portion of the wires, in order to flatten the desired length of wire to a thickness which will permit the final insulated adaptor unit to possess the desired flexibility and bend radius, and leaving both ends of the wires in their original round state; 5) Laying down a flat sheet of reinforcing material on both sides of the flattened wires to increase puncture resistance, durability, etc. as desired; 6) Insulating the plurality of thus flattened wires so that the round end portions of the wires remain exposed outside of the molded insulating portion; 7) Attaching plug ends, insulated extension cords, ground fault circuit interrupters, etc. to the molded insulated subassembly as desired. Suitable reinforcing cords/threads can be made from materials such as Kevlar, Nylon, etc. that could be provided along the edges or in between the conductors or flattened wires. The reinforcing material can be braided, single or multi-strands, flat, etc. The reinforcing material would reinforce the insulation applied over the conductors or flattened wires against ripping etc. when twisted or stretched, and in doing so, further protect the conductive areas.

The electrical conductors can be made from known conductive materials such as copper or materials such as beryllium-copper alloy or other alloys that will provide a high degree of flexibility and durability. In other embodiments the conductive material can be printed on or otherwise transferred onto a dielectric material and then made available in one or more layers and bonded together with adhesive. An example of such a material is Pyralux® (DuPont, Wilmington, Del.), which is available in many different varieties and configurations. The composite conductive/dialectric material can then be insulated by laminating with a durable, flexible material such as polyimide or other similar material such as FR Coverlay (DuPont, Wilmington, Del.).

The electrical conductors in the flattened portion of the electrical devices can also be manufactured using other methods, including but not limited to stamping or pre-forming the conductors and welding/soldering layers of flat copper foil together and welding/soldering round insulated wire to the ends of the layered assembly and molding the insulating layer to the subassembly or other methods and techniques that will become apparent upon reading the present disclosure.

The present invention also provides for clock timers, syncing devices, remote control units, and other adaptors that may be used in connection with the electrical devices or flattened portions of the electrical devices for purposes of provided central communication capability for multiple units plugged into various independent power sources.

The present invention further provides holding brackets such as flexible pressure clips that may be used to hold the electrical devices in place when mounted in a vertical setting, as well as mountings for window sills, etc. to keep the plug ends of the device in a suitable position.

According to another embodiment the present invention provides an indoor-outdoor electrical power access unit that can be built into existing windows at the time of manufacture or installed into existing windows with an adapter kit, that includes insulating bushings, the required wiring and plug ends on both indoor and outdoor surface areas of the window sash, and caps that can be removed when power is desired to that portion of the outdoor area of the building. In some cases, it may be desirable to offset the inside and outside plug ends because of limited space, locking mechanisms, chain and pulley or window roller devices, etc., that make the direct through-hole mounting impractical. In these cases, the manufacturer built-in option can be accomplished by offset mounting the two plug ends in a convenient location and connecting them with insulated wiring within the window sash. The wiring can be standard insulated round wiring, or wiring with a flattened portion as described above, if necessary to accommodate available space limitations.

This embodiment of the electrical device can be easily implemented by providing household 115V AC power through a window frame either during window manufacturing, or as a retrofit to an existing window. This can be accomplished using either standard electrical connector sizing or in the case of limited available space with a reduced connector sizing.

Both implementations of this embodiment (manufacture and retrofit) can utilize a hollow tube which extends through the window sash. In essence, this results in an unobstructed passage through the sash with an inside diameter of approximately 1.00 inch or otherwise suitably sized to pass the necessary wires through and/or for coupling to electrical boxes. For the manufactured variation the tube could be a plastic tube welded or otherwise bonded in place through the vinyl window sash. In the retrofit application the tube could be provided with a flange on one end and a threaded retaining ring or nut on the opposite end.

The tube can be provided with an integrated keying/locking pin similar to an L-lock pin and slot or similar spring-loaded locking function. In both cases, a blank weather-sealing plug or cap can be provided to seal the opening or end(s) of the tube when it is not being used for power pass thru.

In this embodiment the electrical conductors, which can be provided in a cylindrical insert will fit into the tube and lock into place using the pin and L-slot or spring retainer. On the outside end, a standard, 125V 15 A three pole, grounded female power receptacle is molded into the cylindrical insert so that when installed into the tube, a standard household power outlet is provided flush with the outer window frame surface. A flexible, two or three wire power cord can be permanently molded onto the inside end of the cylindrical insert and provides a means of applying power to the device either directly from a household wall outlet, or via a permanently applied Ground Fault Circuit Interrupter applied to the cord end.

Because of certain window frame sizing in existing designs, it may not be possible to apply a device through the frame with an outside diameter of approximately 1.125 inches. In such a situation a device assembly with similar features and characteristics discussed above can be utilized except a non-household-standard twist-locking outlet can used instead of the 125V, 15 A household standard. This option can reduce the overall diameter but requires the addition of a short adapter unit on the outside. This adapter unit can consist of a male twist-lock connector (compatible to that of the pass-through cylinder) on one end and household standard plug end(s) on the other. The adapter unit is installed and twist-locked onto the pass-through cylinder, and used to interconnect the pass-through cylinder to a one, two or three outlet 125V, 15 A outdoor extension device via outdoor extension-rated three wire electric cable.

Figure 1:
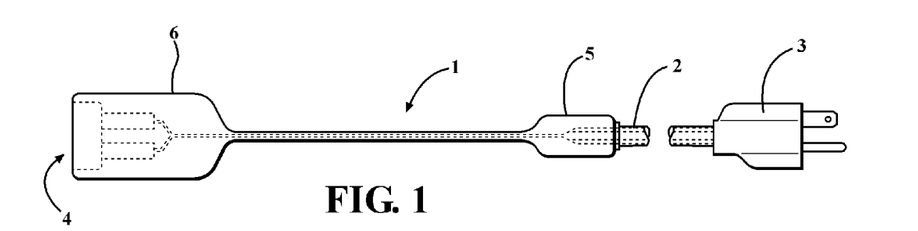
FIG. 1 is a side view of an electrical device according to one embodiment of the present invention.

FIG. 1 is a side view of an electrical device according to one embodiment of the present invention. The electrical device shown in FIGS. 1-5 includes a flattened portion 1, a length of electrical cord 2 on one end having a free end which is coupled to a standard male electrical outlet plug 3. The opposite end of the flattened portion 1 is coupled to a group of standard female electrical outlets 4.

As shown in FIG. 1 there is a transition portion 5, 6 on either end of the flattened portion 1 at which the electrical device transitions from a thickness that is sufficient to enable coupling of the flattened portion 1 to both the electrical cord 2 and the female electrical outlets 4 and to the flattened portion 1.

Figure 2:
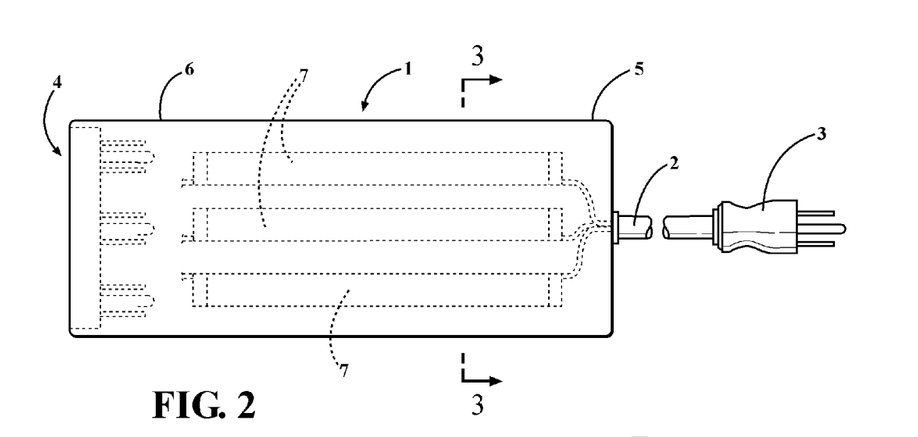
FIG. 2 is a top view of the electrical device of FIG. 1.

FIG. 2 is a top view of the electrical device of FIG. 1. As shown in FIG. 2, two or more flat or flattened electrical conductors 7 extend within flattened portion 1 and have ends that terminate within the respective transition portions 5, 6. Within the transition portions electrical leads or wires couple the flat or flattened electrical conductors 7 to the male outlet plug 3 and each of the female outlets 4.

Figure 3:
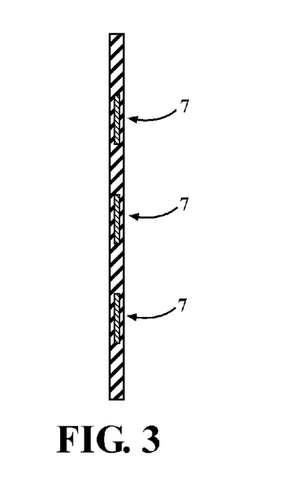
FIG. 3 is a sectional view of the electrical device of FIG. 1 taken along section lines

FIG. 3 is a sectional view of the electrical device of FIG. 1 taken along section lines FIG. 3 depicts the spacing between the flat or flattened electrical conductor 7 and the insulating covering into which the flat or flattened electrical conductors 7 are encased or embedded.

Figure 4:
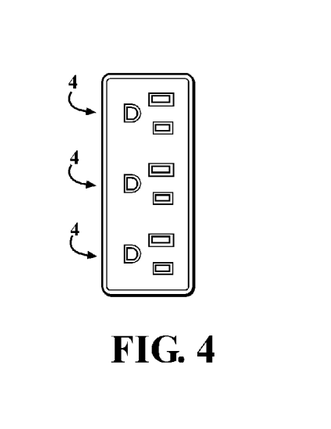
FIG. 4 is an end view of the electrical device of FIG. 1.

FIG. 4 is an end view of the electrical device of FIG. 1. FIG. 4 depicts three female electrical outlets 4. In practice more than three or less than three female electrical outlets could be provided.

Figure 5:
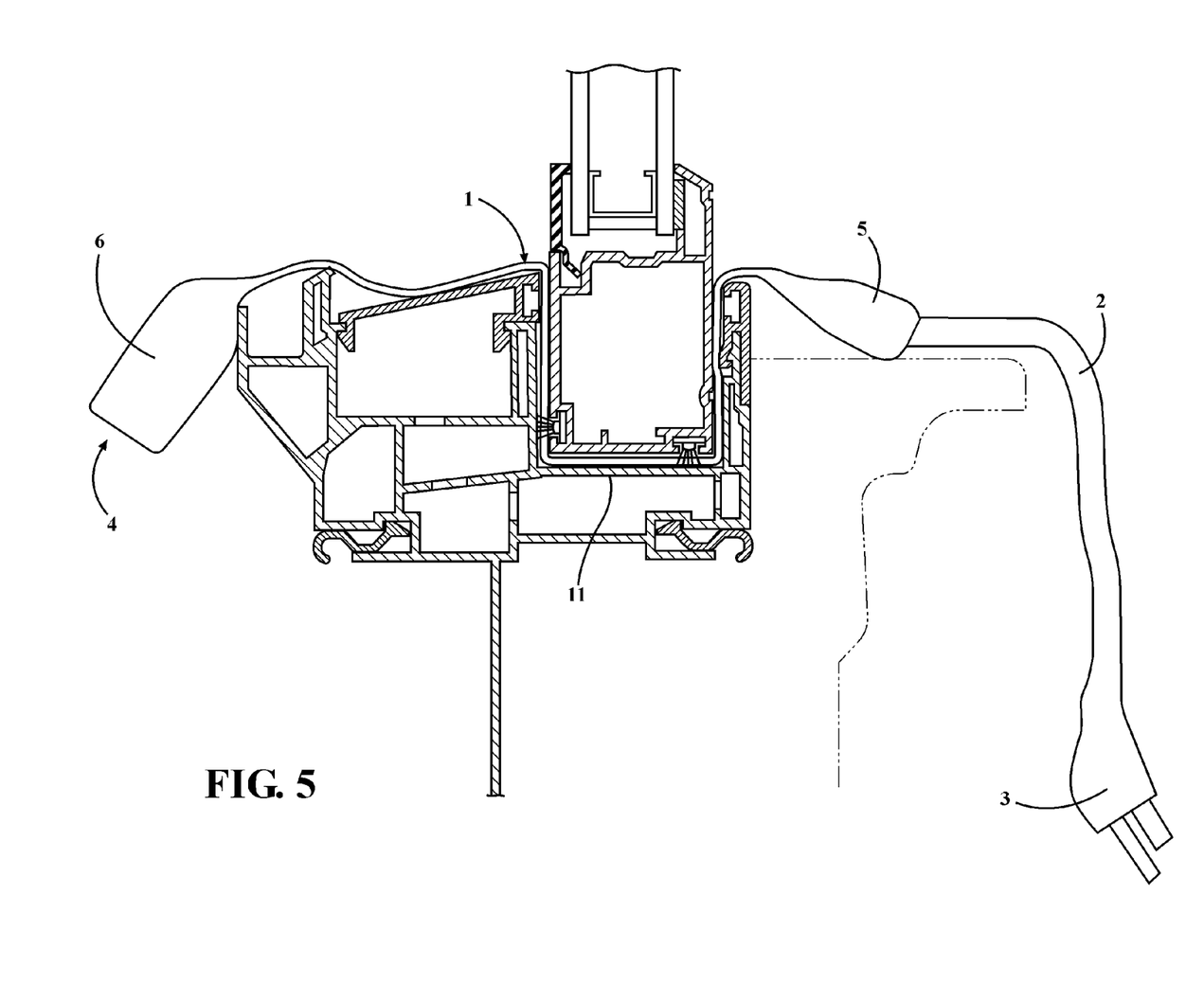
FIG. 5 is a side view of the electrical device of FIG. 1 installed in a window opening.

FIG. 5 is a side view of the electrical device of FIG. 1 installed in a window opening. As shown in FIG. 5, in use the electrical device is positioned through a window opening so that the flattened portion 1 extends between the window sash 10 and the window jamb/sill 11. In this position of the flattened portion 1, the window can be closed and locked in a normal manner. The transition portion 5 with the electrical cord 2 extends within the interior of the building having the window and the transition portion 6 with the female electrical outlets 4 extends outside of the window. The length of the electrical cord 2 should be sufficient to allow the male outlet plug 3 to be plugged into a standard electrical outlet located within the building having the window.

FIGS. 1-5 provide a limited example of the electrical devices of the present invention. As discussed above, the electrical devices of the present invention could have many different configurations, such as but not limited to having a length of electrical cord coupled to and extending outward from both ends or either end of the flattened portion. Other embodiments could have female electrical outlets and male outlet plugs on both or opposite ends of the electrical cords or transition portions of the electrical devices. Alternative embodiments could include only two electrical conductors or three electrical conductors (including a ground). One or more than one female electrical outlets could be provided on one end of the flattened portion or at the ends of one or more electrical cords that are coupled to and extend outward from the flattened portion.

In other embodiments clock timers, ground fault circuit interrupters, surge protectors, fuses or circuit breakers, syncing devices, remote control units, and other adaptors that may be used in conjunction with the electrical devices of the present invention or directly coupled to the flattened portions. It is also within the scope of the present invention to couple any electrical device such as a lamp, a light, a string of lights, a clock, radio, etc. directly to the flattened portion or to an electric cord coupled to the flattened portion rather than provide female electrical outlets.

Figure 6:
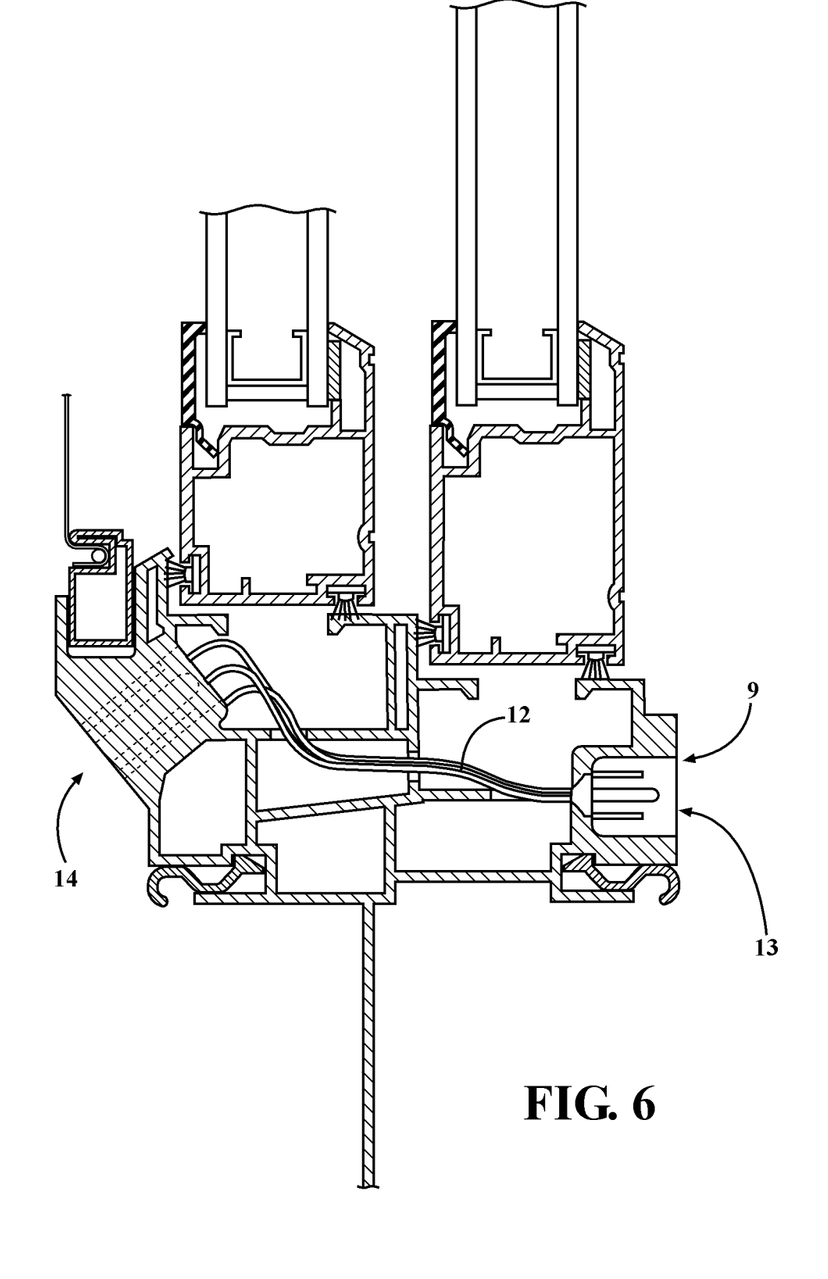
FIG. 6 is a cross sectional view of an embodiment of an outdoor electrical power access unit that is built into the vertical jamb of a window according to the present invention.

FIG. 6 is a cross sectional view of an embodiment of an outdoor electrical power access unit that is built into the vertical jamb of a window according to the present invention. In FIG. 6 a male electrical outlet plug 13 is provided on an interior portion of the window 9 and a female electrical outlet 14 is provided on an exterior portion of window and a wire package or bundle 12 is threaded through the window. As depicted, the male electrical outlet plug 13 is recessed into the interior portion of the window with the recessed configured to receive the female end of a standard electrical cord. If desired, both the male electrical outlet plug 13 and the female electrical outlet 14 can be covered with caps, lids, plugs, or other types of covers when not in use.

Figure 7:
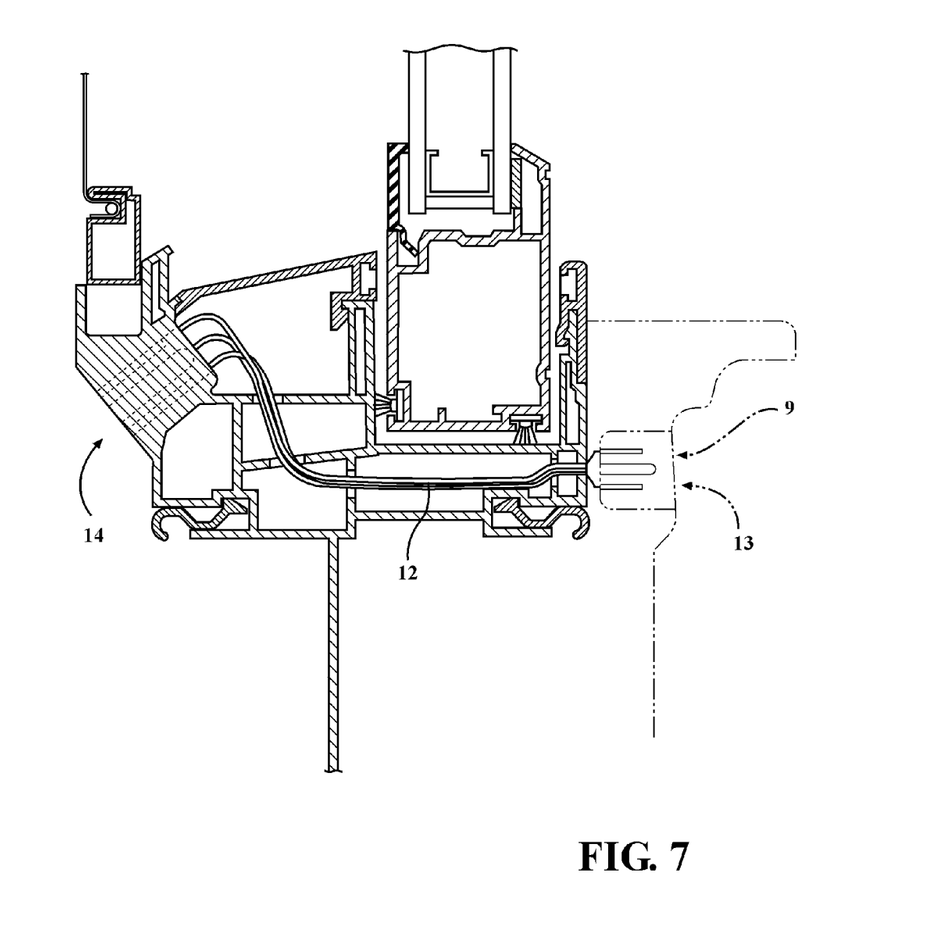
FIG. 7 is a cross sectional view of an embodiment of an outdoor electrical power access unit that is built into the sill mounting of a window according to the present invention.

FIG. 7 is a cross sectional view of an embodiment of an outdoor electrical power access unit that is built into the sill mounting of a window according to the present invention. In FIG. 7 a male electrical outlet plug 13 is provided on an interior portion of the window 9 and a female electrical outlet 14 is provided on an exterior portion of window and a wire package or bundle 12 is threaded through the window. As depicted, the male electrical outlet plug 13 is recessed into the interior portion of the window with the recessed configured to receive the female end of a standard electrical cord. If desired, both the male electrical outlet plug 13 and the female electrical outlet 14 can be covered with caps, lids, plugs, or other types of covers when not in use.

Figure 8A:
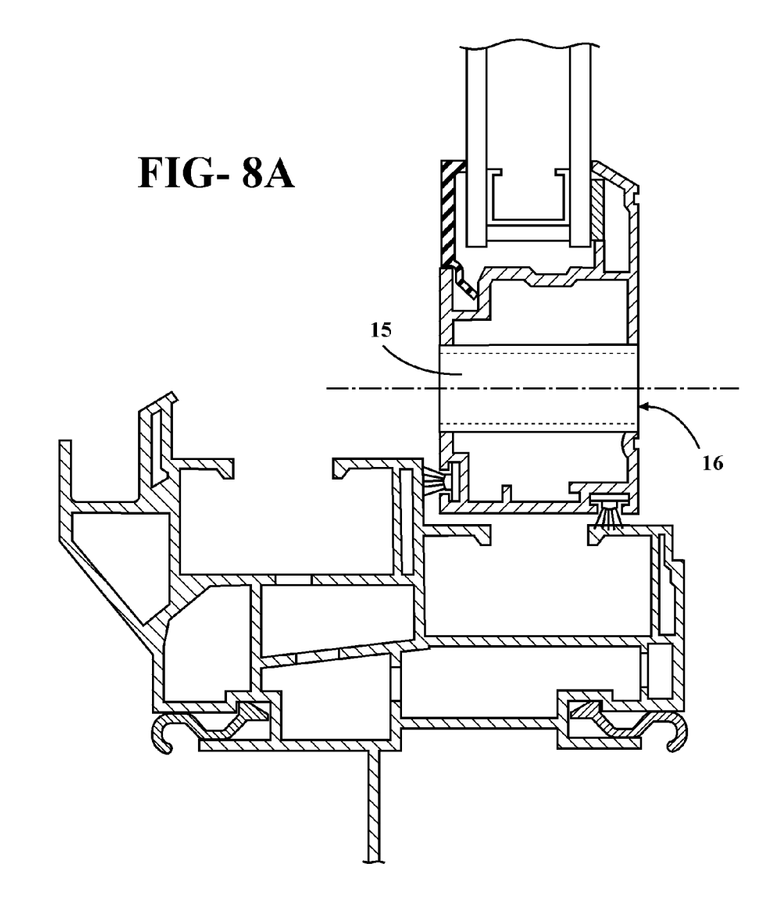
FIG. 8A is a cross sectional view of an embodiment of an outdoor electrical power access unit that is built into a window sash according to the present invention.
Figure 8B:
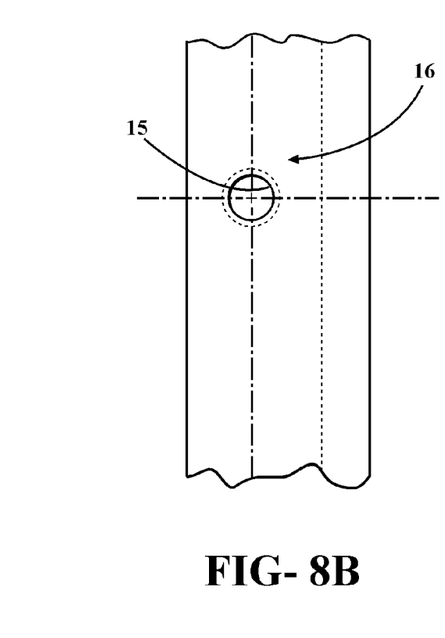
FIG. 8B is a partial planar view of the window sash of FIG. 8A.

FIG. 8A is a cross sectional view of an embodiment of an outdoor electrical power access unit that is built into a window sash according to the present invention. FIG. 8B is a partial planar view of the window sash of FIG. 8A. FIGS. 8A and 8B depict a tube 15 that extends through the window sash 16. The tube 15 can extend straight through the sash or extend at an angle as desired. A wire package or bundle or separate wires can extend through the tube 15 and a male electrical outlet plug and a female electrical outlet can be coupled into the interior and exterior ends of tube 15 as discussed in reference to FIGS. 9A-9C.

Figures 9A, 9A, 9B, 9B, 9C, 9C, 9C:
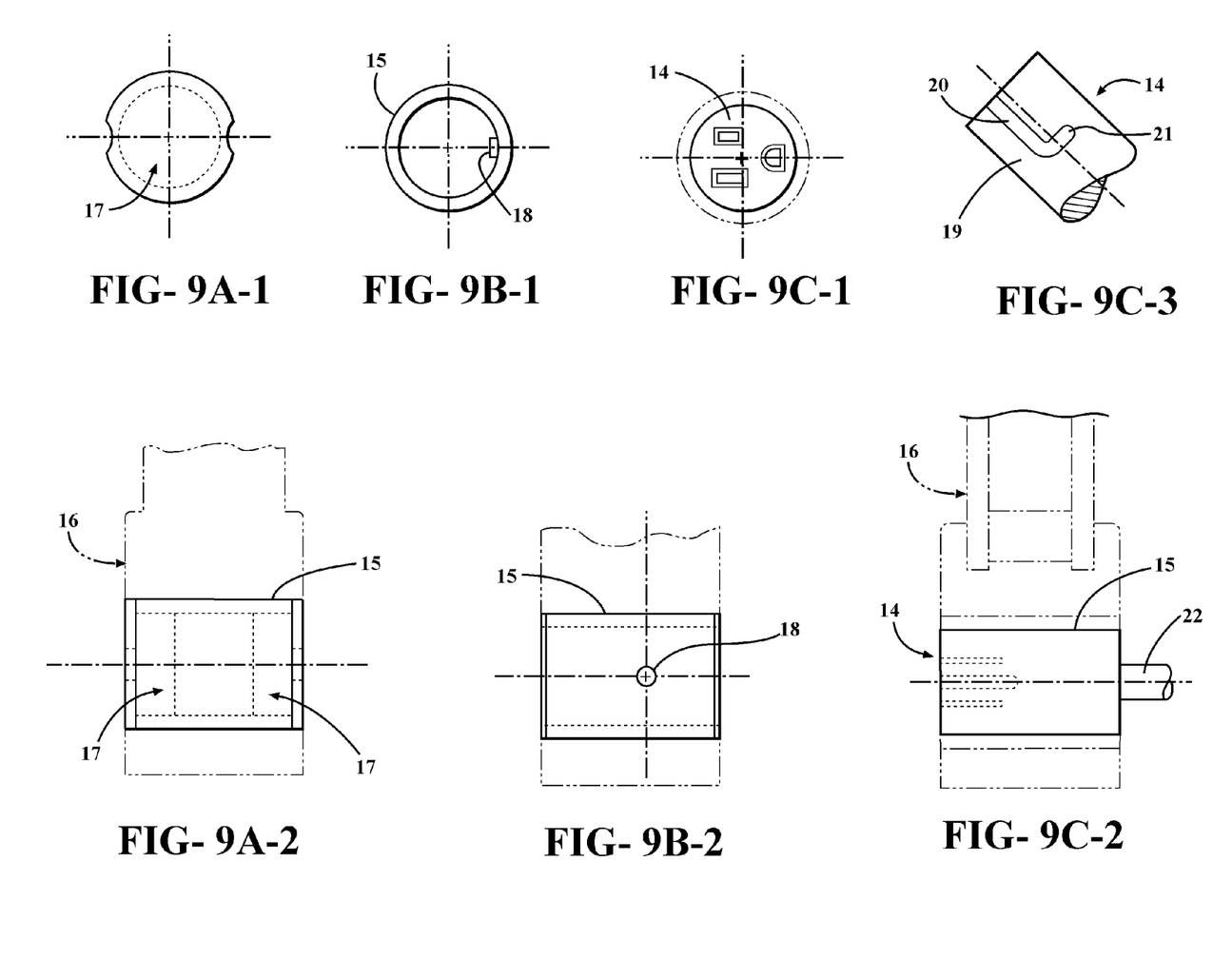
FIG. 9A is cross sectional view of an embodiment of an outdoor electrical power access unit that is built into a window sash according to the present invention.
FIG. 9B is a cross sectional view of the embodiment of FIG. 9A depicting details of the tube.
FIG. 9C is an exploded view of the embodiment of FIG. 9A depicting details of a plug end.

FIG. 9A is a cross sectional view of an embodiment of an outdoor electrical power access unit that is built into a window sash according to the present invention. FIG. 9A depicts a tube 15 that extends through sash 16 in a manner similar to that shown in FIGS. 8A and 8B. The ends of the tube shown in FIG. 9A are closed with caps or plugs 17 which can insulate between the interior and exterior ends of the tube 15 as well as seal out moisture.

FIG. 9B is a cross sectional view of the embodiment of FIG. 9A depicting details of the tube. The tube 15 in FIG. 9B has an inward protruding pin 18. In further embodiments the tube 15 could be provided with two or more protruding pins 18.

FIG. 9C is an exploded view of the embodiment of FIG. 9A depicting details of a plug end. The embodiment of FIGS. 9A-9C provides an electrical outlet (female electrical outlet) at the exterior end of tube 15. The female electrical outlet 14 is provided as a unit that includes a slot or groove 19 formed in the outer surface of the unit. The slot has an axial extended portion 20 and a circumferential extending portion 21. The female electrical outlet unit 14 with electrical cord 22 coupled at the interior end is inserted into tube 15 from the interior end toward the exterior end. Pin 18 is received in the axial portion 20 of slot or groove 19 as the female electrical outlet unit 14 is pushed into tube 15. As the pin reaches the circumferential extending portion 21 of slot or groove 19 the exterior face of the female electrical outlet unit 14 is at a flush or slightly recessed position (or any desired position) with respect to the exterior end of tube 15. Then the female electrical outlet unit 14 is rotated so that the pin 18 moves along the circumferential extending portion 21 of slot or groove 19, securing the female electrical outlet unit 14 in position.

It is to be understood that the pin(s) and slot(s) or groove(s) can have any configuration which will permit the female electrical outlet unit 14 to be received in and secured in tube 15.

Figure 10A:
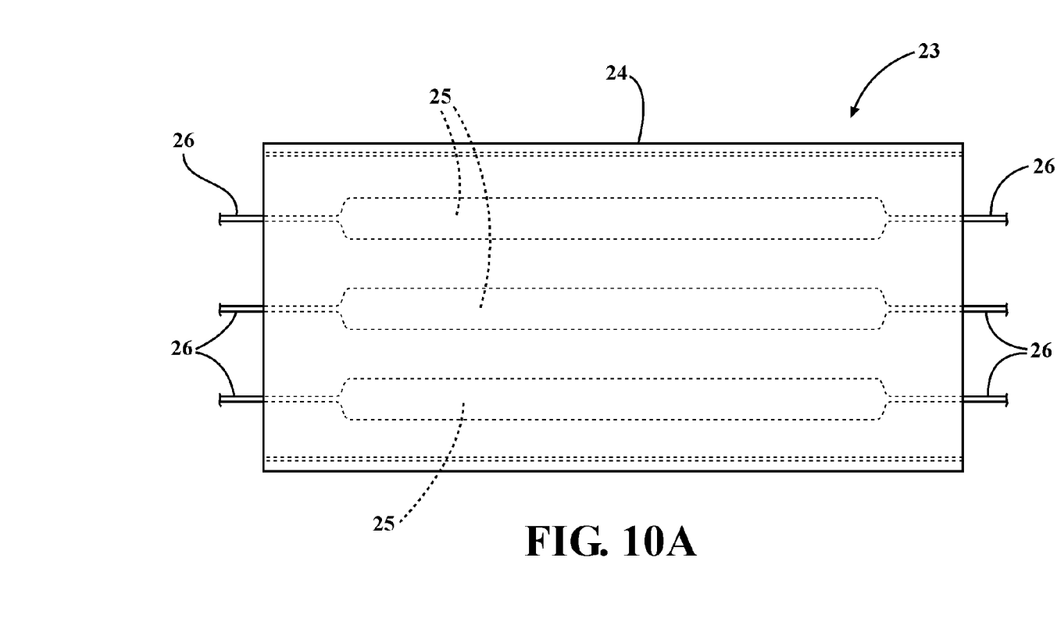
FIG. 10A is a top planar view of a wire package according to one embodiment of the present invention.
Figure 10B:
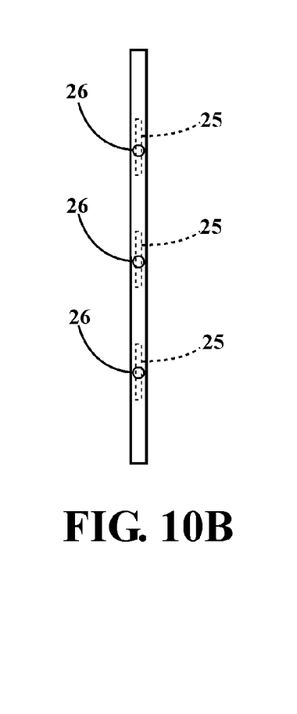
FIG. 10B is an end view of the wire package of FIG. 10A.
Figure 10C:
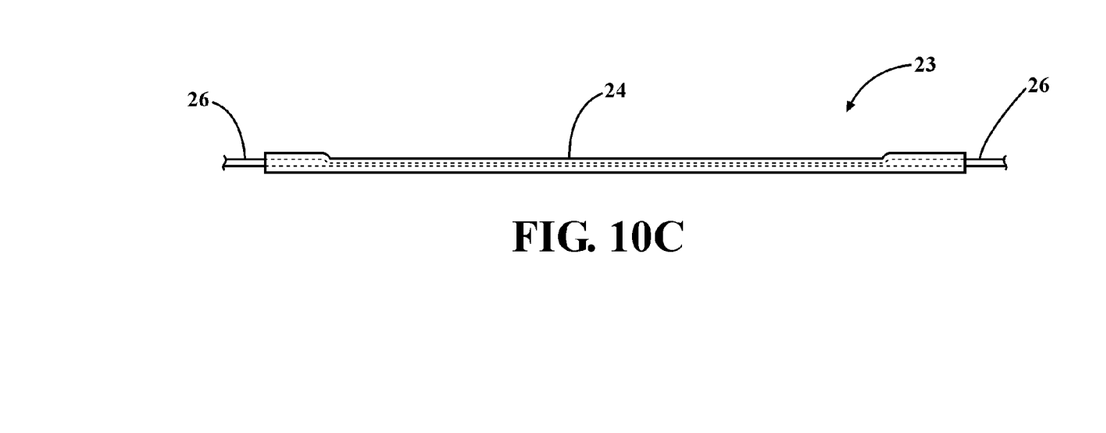
FIG. 10C is a side view of the wire package of FIG. 10A.

FIG. 10A is a top planar view of a wire package according to one embodiment of the present invention. FIG. 10B is an end view of the wire package of FIG. 10A. FIG. 10C is a side view of the wire package of FIG. 10A. The wire package 23 includes a flatten portion 24 that includes two or more flat or flattened electrical conductors 25 that are encased in an insulating material. The ends of the flat or flattened electrical conductors 25 are coupled to (or integrally formed with) round conductors 26 by which the flat or flattened conductors 26 of the wire package 23 can be coupled to male electrical outlet plugs and/or female electrical outlets and/or electrical cords.

Figure 11A:
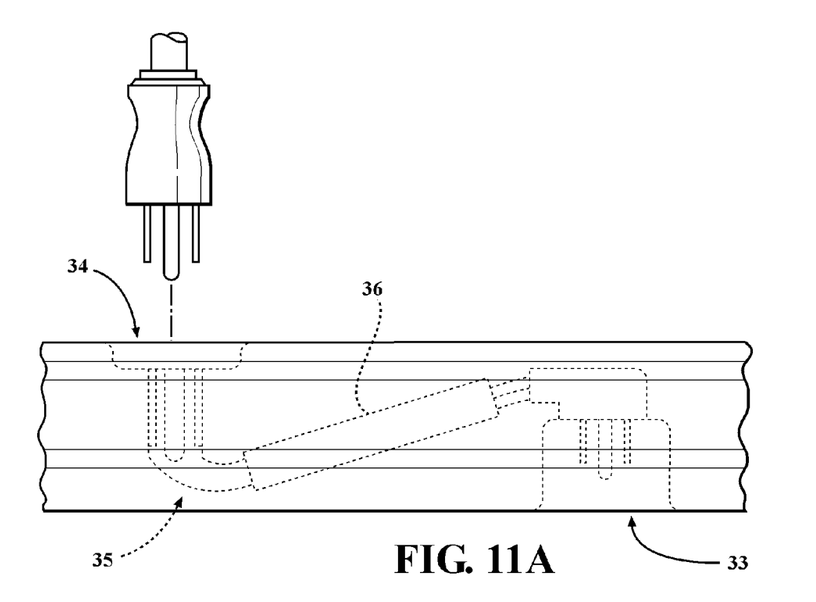
FIG. 11A is a partial top sectional view of another embodiment of an outdoor electrical power access unit that is built into a window sash according to the present invention.
Figure 11B:
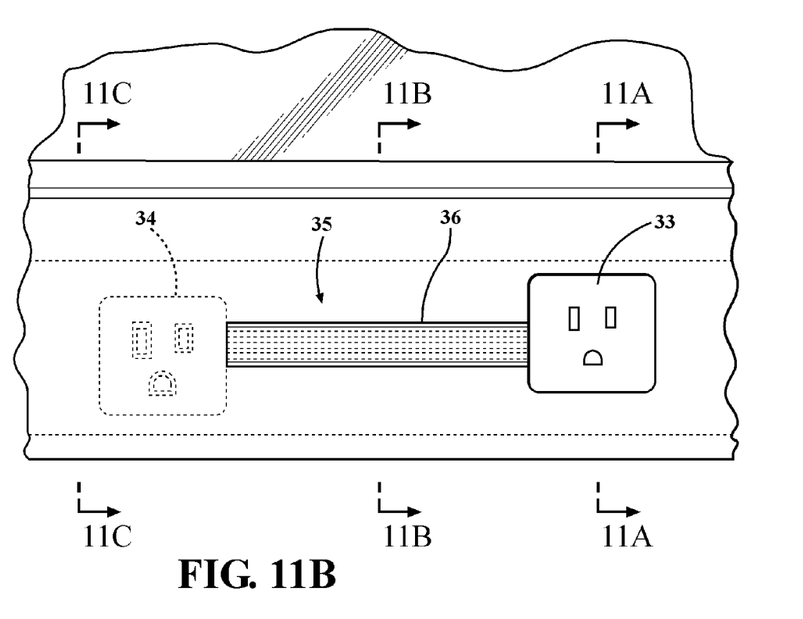
FIG. 11B is a partial planar view of the embodiment of the invention of FIG. 11A.
Figure 11C:
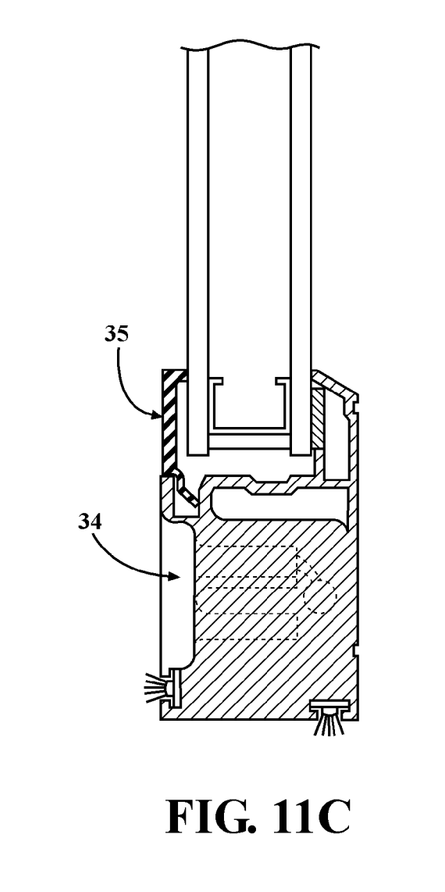
FIG. 11C is a sectional view taken along section lines XI-XI in FIG. 11B.
Figure 11D:
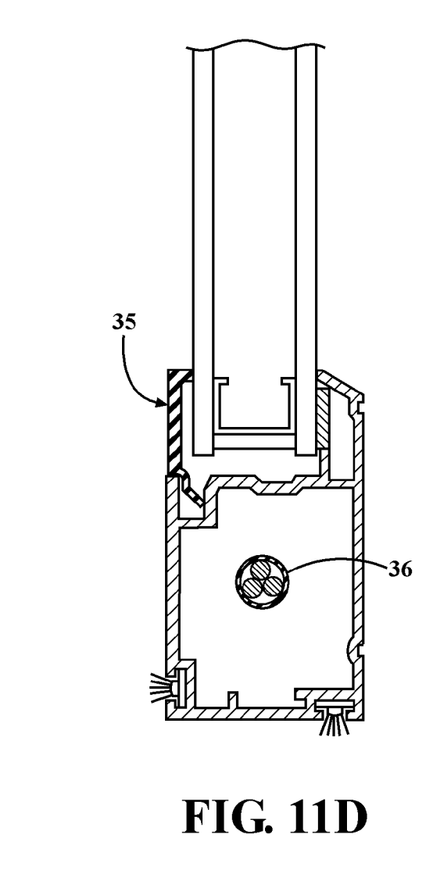
FIG. 11D is a sectional view taken along section lines XII-XII in FIG. 11B.
Figure 11E:
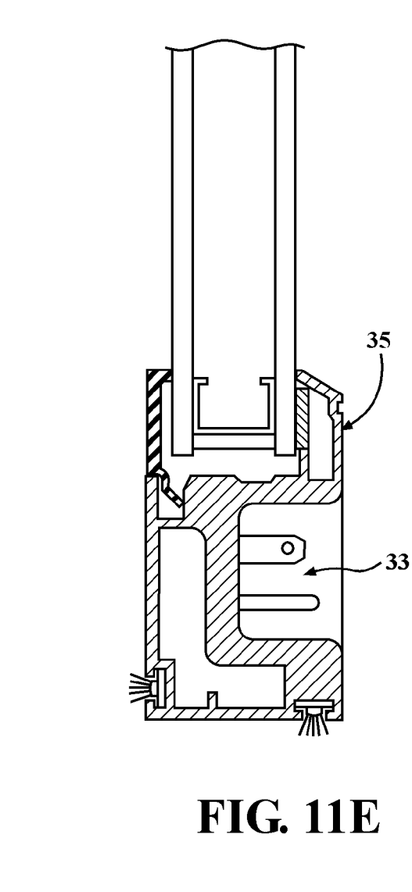
FIG. 11E is a sectional view taken along section lines XIII-XIII in FIG. 11B.

FIG. 11A is a partial top sectional view of another embodiment of an outdoor electrical power access unit that is built into a window sash according to the present invention. FIG. 11B is a partial planar view of the embodiment of the invention of FIG. 11A. FIG. 11C is a sectional view taken along section lines XI-XI in FIG. 11B. FIG. 11D is a sectional view taken along section lines XII-XII in FIG. 11B. FIG. 11E is a sectional view taken along section lines XIII-XIII in FIG. 11B.

In the embodiment of the invention depicted in FIGS. 11A-11E a male electrically outlet plug 33 and a female electrical outlet 34 are offset due to the fact that the window sash 35 is not deep enough to provide clearance so that the male electrical outlet plug 33 and female electrical outlet 34 can be directly opposed from one another on opposite sides of the window sash 35. In this embodiment a wire package or bundle of wires 36 (or separate wires) extend within the window sash 35 between the male electrical outlet plug 33 and female electrical outlet 34. FIG. 11D depicts the wiring package or bundle or wires 36 as including a tube or conduit through which the wires extend. It is to be understood that while a single female electrical outlet 34 is depicted in FIGS. 11A-11E it is within the scope of the invention to include two or more female electrical outlets on the same or opposite sides of the male electrical outlet plug 33 with appropriate wiring connecting the female electrical outlets 34 to the male electrical outlet plug 33.

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above and set forth in the attached claims.

The invention claimed is:

1. An electrical device for providing electrical power between the interior and exterior sides of an opening in a building which comprises:
    a flattened portion comprising a plurality of flattened electrical conductors having rectangular cross-sectional shapes;
    a first length of electrical cord having a plurality of electrical conductors coupled to one end of the flattened portion with the plurality of electrical conductors of the first length of coupled to the plurality of electrical conductors of the flattened portion;
    a male electrical outlet plug on a free end of the first length of electrical cord with the plurality of electrical conductors of the first length of electrical cord coupled to the male electrical outlet plug;
    a second length of electrical cord having a plurality of electrical conductors coupled to another end of the flattened portion with the plurality of electrical conductors of the second length of electrical cord coupled to the plurality of electrical conductors of the flattened portion; and
    at least one female electrical outlet coupled to a free end of the second length of electrical cord with the electrical conductors of the second length of electrical cord coupled to the at least one female electrical outlet, wherein the flattened portion and the plurality of electrical conductors of the flattened portion having the rectangular cross-section are sufficiently flat to extend between a jamb/sill and sash of a fully closed window.

2. An electrical device for providing electrical power between the interior and exterior sides of an opening in a building according to claim 1, wherein the at least one female electrical outlet comprises more than one female electrical outlets.

3. An electrical device for providing electrical power between the interior and exterior sides of an opening in a building according to claim 1, wherein the electrical conductors of the flattened portion have heights and widths with the widths being substantially greater than the heights.

* * * * *